Figure 1:
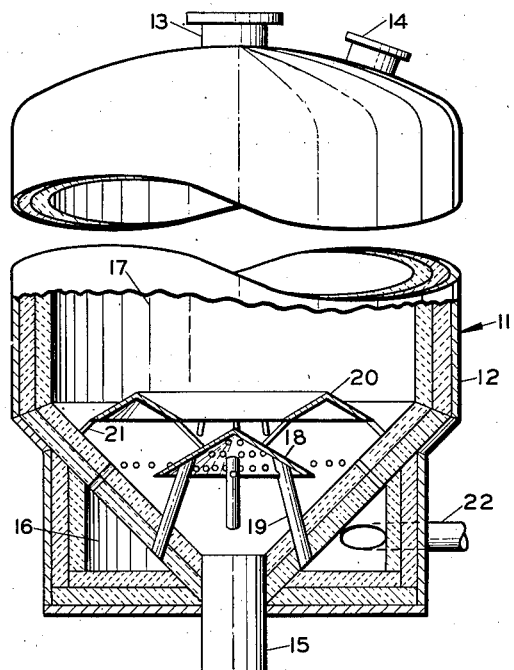

Jan. 8, 1952     R. R. GOINS     2,582,116

PEBBLE HEATER CHAMBER DESIGN

Filed Aug. 24, 1948     2 SHEETS—SHEET 1

*INVENTOR.*
R. R. GOINS
BY
Hudson and Young
*ATTORNEYS*

Jan. 8, 1952  R. R. GOINS  2,582,116
PEBBLE HEATER CHAMBER DESIGN
Filed Aug. 24, 1948  2 SHEETS—SHEET 2

INVENTOR.
R.R. GOINS
BY
ATTORNEYS

UNITED STATES PATENT OFFICE 2,582,116

PEBBLE HEATER CHAMBER DESIGN

Robert R. Goins, Bartlesville, Okla., assignor to Phillips Petroleum Company, a corporation of Delaware Application August 24, 1948, Serial No. 45,861

7 Claims. (Cl. 263—19)

This invention relates to pebble heater apparatus. In one of its more specific aspects, it relates to improved pebble heater and reaction chambers of pebble heater apparatus. In another of its more specific aspects, it relates to a method of regulating pebble flow through pebble heater apparatus. In another of its more specific aspects, it relates to a method of obtaining even distribution of gaseous material through pebble heater and reaction chambers.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first or upper chamber. That material forms a moving or fluid bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact gaseous reactant materials in a second direct heat exchange relation, furnishing heat for the treatment or conversion of the gaseous materials.

Conventional pebble heater chambers of pebble heater apparatus are generally formed as cylinders and a solid heat exchange material is passed thereinto in the form of a moving bed. Hot heat exchange gases are sometimes introduced into the upper cylindrical bed at the lower end and at the periphery of such chambers and are sometimes introduced through a perforate refractory arch which supports the moving pebble bed. The solid heat exchange material is withdrawn from a substantially central point in the bottom of the bed and is passed downwardly into a gas heating chamber where a second moving bed of solid heat exchange material is formed. One disadvantage of conventional pebble chambers in which a relatively shallow pebble bed is maintained and which has a single pebble outlet in its lower end, is that it is most difficult to establish uniform flow of uniformly heated solid heat exchange material through the pebble chambers. In chambers in which the withdrawal of solid heat exchange material is made from a substantially central point in the bottom of the pebble chamber, the center of the pebble bed tends to drop out at levels nearer the outlet than about one to one and one-half times the diameter of the cylinder served by the single pebble outlet. Another disadvantage of the conventional pebble heater apparatus is that gas which is introduced into the pebble chambers is not evenly distributed through the pebble bed, thus failing to accomplish the most efficient heat exchange.

Solid heat exchange material, which is conventionally used in pebble heater apparatus, is generally called "pebbles." The term "pebbles" as used herein, denotes any solid refractory material of flowable size and form, having strength which is suitable to carry large amounts of heat from the pebble heating chamber to the gas heating chamber without rapid deterioration or substantial breaking. Pebbles conventionally used in pebble heater apparatus are substantially spherical and range from about one-eighth inch to about one inch in diameter. In a high temperature process, pebbles having a diameter between one-fourth and three-eighths inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other material having the properties above described may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic when used in any selected processes.

An object of the invention is to provide improved means for thermally treating or reacting gaseous materials. Another object is to provide improved means for controlling pebble flow through pebble heater apparatus. Another object is to provide an improved method of controlling pebble flow through pebble heater apparatus. Another object is to provide improved means for more evenly effecting improved heat exchange in pebble heater apparatus. Another object is to provide an improved method for distributing gaseous materials through chambers of pebble heater apparatus. Other and further objects and advantages will be apparent upon study of the accompanying discussion, the drawings, and the claims.

Figure 3:
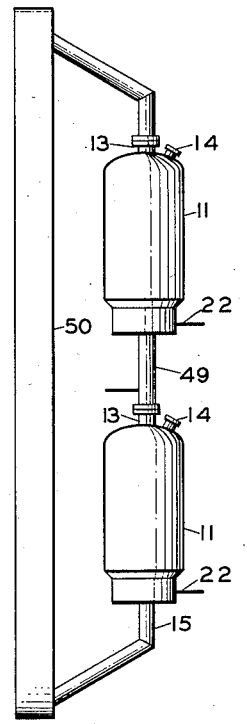
Figure 2:
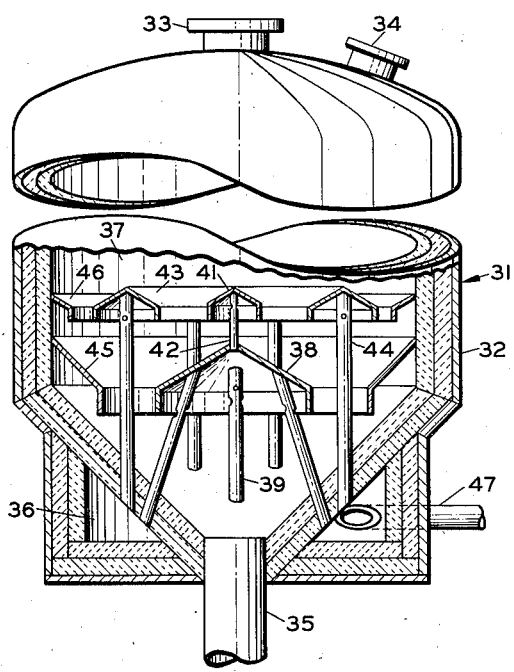
Figure 4:
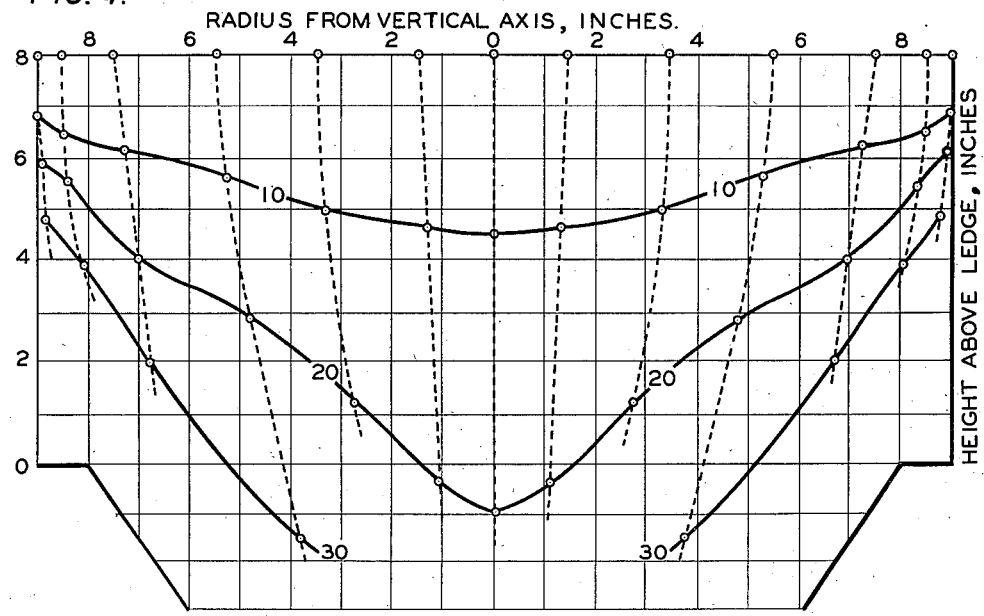
Figure 5:
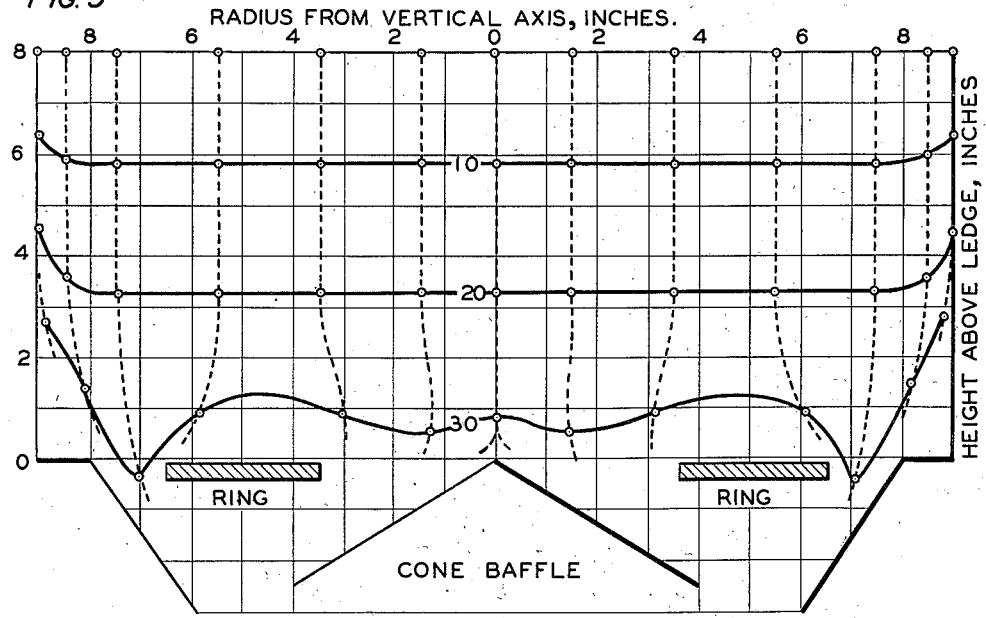

Understanding of the invention will be facilitated upon reference to the diagrammatic drawings, in which Figure 1 is a vertical, partial section of a pebble chamber embodying the invention. Figure 2 is a vertical, partial section of a pebble chamber embodying a modification of the invention. Figure 3 is a schematic view of a pebble heater apparatus. Figure 4 is a graph showing pebble flow patterns in a pebble chamber not provided with this invention. Figure 5 is a graph showing pebble flow patterns in a pebble chamber equipped with pebble baffles of this invention.

In Figure 1, pebble chamber 11 comprises a substantially vertically disposed shell 12 which is closed at its upper end and lower end. The walls of shell 12 are lined with insulating means, which insulating means may include common refractory material and super-refractory material, as well as other insulation material. The exact materials utilized in the formation of the shell lining will depend upon the temperatures to be experienced within the given shell. When the pebble chamber is to be utilized as a pebble heating chamber, super-refractory materials backed by other insulation materials are preferred because high temperatures, i. e., ranging as high as from 3000 to 3300° F., are experienced therein. When the chamber is utilized as the gas heating chamber of a pebble heating apparatus, insulation materials having somewhat lower heat resistance may be utilized. Common refractory materials which may be utilized may include block insulation, insulating fire brick, and fire clay fire brick. Super-refractory materials may include silicon carbide, mullite, alumina, or other suitable refractory materials having physical and chemical properties which provide sufficient strength to withstand reasonably heavy external pressure and high temperature without substantial breakage or deterioration.

Shell 12 is preferably provided with a pebble inlet 13 substantially centrally disposed in the upper end of said shell. It is also provided with an effluent outlet conduit 14 in its upper portion. Pebble outlet 15 is disposed substantially centrally in the lower end of shell 12. Gas distribution chamber 16 is formed adjacent the lower end of pebble chamber 17 formed within shell 12 by a wall of refractory material which may be perforate so as to allow the passage of a portion of gas therethrough. Pebble chamber 17 is preferably provided with a conical bottom, although such form is not required. Baffle 18, preferably having a circular cross-section, is provided within chamber 17 and is disposed substantially coaxially with outlet 15 and spaced therefrom so as to allow sufficient room for the passage of pebbles thereover into outlet 15. Baffle 18 may or may not be perforate and is preferably supported by conduit members 19 which communicate between gas distribution chamber 16 and points adjacent the underneath side of baffle 18. The material from which conduits 19 may be formed will depend upon the temperatures to be maintained within chambers 16 and 17. If low temperatures are to be utilized therein, metal alloys may be used to form conduit 19. If, however, chamber 16 is utilized as a combustion chamber as well as a gas distribution chamber, and chamber 17 is utilized as a pebble heating chamber, baffle 18 and conduits 19 will necessarily have to be formed of more highly heat resistant materials, such as metal alloys or super-refractories. The outer diameter of baffle 18 is preferably larger than the inner diameter of pebble outlet 15. Disposed substantially coaxially with and spaced above baffle 18 is peripheral and preferably annular baffle 20, the inner diameter of which is preferably smaller than the outer diameter of baffle 18 and the outer diameter of which is considerably greater than that of baffle 18 but smaller than the inner diameter of the refractory wall. Baffle 20 is preferably maintained in position by supports 21 extending from baffle 18 and which may also extend from the refractory wall. Supports 21 may be either formed as hollow conduits or as solid supports. The materials used to form conduits 21 will depend, as do baffles 18 and 20, upon the temperatures to be maintained in the pebble chamber. Gaseous material inlet means 22 is provided in chamber 16 so as to inject gaseous material into said chamber. Conduit 22 is shown as being tangentially directed into chamber 16 but may be disposed at any angle. Conduits 22 may be either in the form of burners or may be only common tubular conduits. It is contemplated that burners or conduits extending through the bottom section of chamber 16 may also be utilized.

Baffle 18 may be either in the form of a cone or in the form of a flat plate. The inverted cone construction is preferred, however, inasmuch as pebble flow is considerably benefited thereby. Baffle 20 may be in the shape of a flat ring, but it is preferred that the baffle be in the form of an inverted V. The slope of the inverted V and the conical baffles is preferred to be between 25° and 55°. Such a slope will substantially eliminate formation of stagnant zones upon said baffles. The baffles are preferably spaced above pebble outlet conduit 15 a sufficient distance to be above the angle of repose of the pebbles taken at conduit 15 and below the angle of slip. The angle of slip varies and may be defined generally as the angle between a horizontal plane and the line of cleavage between stagnant and moving zones of pebbles as the pebbles are withdrawn through a constricted pebble outlet in the bottom of a pebble chamber.

In the operation of the device shown in Figure 1, pebbles are inserted into chamber 11 through pebble inlet conduit 13, forming a contiguous moving bed within chamber 11, and move downwardly therethrough and are removed through pebble outlet 15. As the pebble bed moves downwardly, it is divided by peripheral baffle 20, which somewhat retards the flow of pebbles in the central portion of the chamber. That portion of the pebble bed which passes through the opening in the annular baffle is in turn divided so as to direct portions thereof outwardly to join with other portions of the pebble bed being directed inwardly toward the pebble outlet. Gaseous material is injected through conduit 22 into gas distribution chamber 16. If chamber 11 is utilized as a pebble heating chamber, the gaseous material from conduit 22 may be burned in chamber 16. If chamber 11 is utilized as a gas conversion or heating chamber, the gaseous material passing through conduit 22 remains unignited. In either event, the gaseous material is caused to flow upwardly through conduits 19 and into the concavity formed below baffle 18. As the gases flow into the concavity formed below baffle 18, gaseous material is caused to flow from under the outer periphery of baffle 18 and upwardly into the concavity formed by baffle 20 and is dispersed therefrom upwardly past the inner and outer edges of baffle 20 and is removed through effluent outlet conduit 14. If the upper walls of chamber 16 and baffle 18 are perforate, a portion of the gas will flow upwardly therethrough into chamber 17.

In the device shown in Figure 2 of the drawings, pebble chamber 31 comprises a closed outer shell 32 which is provided in its upper end with a pebble inlet conduit 33 and an effluent outlet conduit 34. Pebble outlet conduit 35 is disposed substantially coaxially in the lower end of shell 32. Gas distribution chamber 36 is formed in the lower end of chamber 31 and is separated from pebble containing chamber 37 formed within chamber 31 by a refractory wall. Conical baffle member 38 is disposed substantially coaxially with and spaced above pebble outlet 35 in the lower portion of chamber 37. Baffle 38 is supported by conduit members 39 which communicate between gas distribution chamber 36 and the concavity formed by baffle member 38. Baffle member 41 is disposed substantially coaxially with and spaced above baffle member 38. Conduit member 42 supports baffle member 41 and communicates between the concavity formed by baffle member 38 and the concavity formed within baffle member 41. Baffle member 43 is disposed substantially coaxially with baffle member 41 and preferably in substantially the same horizontal plane as baffle member 41. Baffle member 43 is supported on conduit members 44 which may communicate between chamber 36 and the concavity formed by baffle member 43 or may extend from baffles 38 and 45. Peripheral baffle member 45 is disposed substantially coaxially with and on substantially the same horizontal plane with baffle member 38 and extends downwardly and inwardly from the inner periphery of the insulation lining of shell 32. The inner diameter of baffle member 45 is preferably smaller than the outer diameter of baffle member 43. Baffle member 46 is disposed substantially coaxially with and on substantially the same horizontal plane as baffle members 41 and 43 and extends downwardly and inwardly from the insulation lining of shell 32. Gaseous material inlet means 47 is provided in chamber 36. Inlet means 47, as shown in Figure 2, tangentially directs the gaseous material into chamber 36. It is contemplated, however, that the gaseous inlet means may be disposed at any angle and so arranged as to direct gas through the side or bottom portion of chamber 36.

The operation of the device shown in Figure 2 of the drawing is similar to that shown in Figure 1. Pebbles are inserted into pebble containing chamber 37 through pebble inlet conduit 33. The inserted pebbles form a contiguous moving bed within chamber 37 and flow downwardly therethrough and outwardly through pebble outlet conduit 35. Baffles 38, 41, 43, 45 and 46 form a pebble flow control zone and deflect the flow of pebbles so as to divide and join the pebble bed portions, causing the pebble bed to flow through a tortuous path in its movement downwardly through chamber 37. Gaseous material is injected into chamber 36 through gaseous material inlet means 47 and flows upwardly through conduits 39, 42 and 44 into the concavity formed by baffles 38, 41 and 43. A continuing supply of gaseous material through the gas inlet conduits causes an overflow of gaseous material from the concavities formed by the baffle members. The gaseous material is caused to flow under the lower edges of the baffle members and upwardly in direct heat exchange through the pebble bed and is removed through effluent outlet conduit 34. The method of operating the device of Figure 2 may be modified so as to inject gaseous material directly from chamber 36 only into the concavity formed by baffle member 38, or the device shown in Figure 1 may be modified so as to supply gaseous material directly from chamber 16 into the concavities formed by both baffle members 18 and 20.

Chamber 11 or chamber 31 may be utilized to form both of the pebble chambers shown in the device of Figure 3 of the drawings. In the device shown in Figure 3, pebbles are inserted by means of upper inlet conduit 13 into chamber 11 and flow, as a contiguous mass, downwardly through the chamber and outwardly through conduit 49 into the lower chamber 11 and downwardly therethrough and out through pebble outlet conduit 15. Gaseous material is injected through upper gaseous inlet conduit 22 and is burned so as to form hot combustion gas which flows countercurrently with and upwardly in direct heat exchange relation with the downwardly flowing bed of pebbles in upper chamber 11. Combustion gases are removed through upper effluent outlet conduit 14. A second gaseous material is injected through lower gaseous material inlet conduit 22 into the lower portion of lower chamber 11 and is caused to flow countercurrently in direct heat exchange relation with the hot pebble mass flowing downwardly through lower chamber 11. The effluent material is removed through lower effluent outlet conduit 14. An inert gas, such as steam, may be injected into conduit 49 so as to prevent the passage of combustion gas into the lower chamber and effluent material from the lower chamber into the upper chamber. The cooled pebbles which are removed through conduit 15 are recycled to upper pebble inlet conduit 13 by elevator means 50.

The size of the pebbles is a determining factor in the size of pebble outlets of pebble heater apparatus. Best pebble flow is secured through outlets which have diameters at least seven or eight times the diameter of the pebble. When circulating pebbles through the baffle arrangements disclosed in Figures 1 and 2 of the drawings, it is preferred that the width of the openings between the baffle members and between the baffles and the side of the pebble chambers be at least seven or eight times the diameter of the pebbles utilized within the chamber. It is preferred that the pebble chamber have a substantially conical shaped bottom so as to substantially eliminate stagnant areas in the pebble bed. It is preferred that the slope of the cone-shaped bottom of the chamber be between about 35° and 55°. Flowing pebbles tend to funnel toward a central outlet. If the bottom of the pebble chamber is not cone shaped, it will be necessary to support the baffle members within the chamber at a sufficient height above the pebble outlet that sufficient space is provided at the peripheries of the baffles as to allow pebbles to flow between the baffles and stagnant pebble bed areas.

Specific advantages to be derived by the utilization of the instant invention will be even more obvious upon reference to the graphs shown as Figures 4 and 5 of the drawing. A model pebble chamber having a diameter of eighteen inches and having a conical shaped bottom, the slope of which was approximately 50° from the horizontal, was filled with pebbles to a depth of eight inches. Given volumes of pebbles were removed through a two and one-half inch outlet in the bottom of the chamber and an equal amount of pebbles were added to the top of the chamber. Colored pebbles were initially positioned in the top layer of the pebble bed. After a given volume of the pebbles was removed from the pebble chamber, the pebbles which had been added were removed so as to measure the position of the colored pebbles in the pebble bed. Figure 4 shows the initial position of the colored pebbles before withdrawal and after withdrawal of 10, 20 and 30 liters of pebbles from the unit without the present invention. Broken arrow lines indicate the direction of flow of the colored pebbles. Isochores connect the positions plotted for the colored pebbles after each withdrawal step.

Figure 5 is a graph showing the flow of colored pebbles through a pebble chamber similar to that described with regard to Figure 4. The chamber of Figure 5 was filled to a depth of eight inches. A form of the invention, a cone baffle together with an annular ring baffle was provided in the lower portion of the pebble chamber and positioned as indicated in the graph. As will be seen in Figure 5, substantially even flow of pebbles is maintained to a point approximately three and one-fourth inches above the conical central baffle. Study of Figure 4 will indicate that the center of the pebble bed begins to drop out at a point approximately seven inches above the height of the conical baffle shown in Figure 5. The above two examples are presented as illustrations only. Their sizes and proportions are presented as being typical and should not be construed to limit the invention unduly.

As will be evident to those skilled in the art, various modifications of this invention can be made or followed in the light of the foregoing disclosure, discussion and examples without departing from the spirit or scope of the disclosure.

I claim:

1. In pebble heater apparatus utilizing a moving bed of pebbles, an improved pebble chamber comprising an upright closed outer shell having a conical bottom; pebble inlet means disposed in the top portion of said shell; gaseous effluent outlet means in the upper portion of said shell; a pebble outlet in the lower end of said shell; a first baffle disposed coaxially with and spaced a sufficient distance above said pebble outlet in the lower portion of said chamber to be above the angle of repose taken at said pebble outlet but below the angle of slip, said baffle being larger in diameter than said pebble outlet; a peripheral baffle, having an inner diameter smaller than the outer diameter of said first baffle and an outer diameter larger than said first baffle but smaller than the inner diameter of said chamber, coaxially disposed with and spaced above said first baffle in the lower portion of said chamber; a gas distribution chamber below and adjacent the conical lower portion of said shell; gas inlet means in said distribution chamber; and gas outlet means communicating through said conical bottom of said shell between said distribution chamber and points adjacent the lower side of said first baffle.

2. The pebble chamber of claim 1, wherein a second peripheral baffle, disposed adjacent the outer edge of said chamber and in substantially the same horizontal plane as said first peripheral baffle, is spaced from said first peripheral baffle at least eight pebble diameters; and a third peripheral baffle disposed adjacent the outer edge of said chamber and in substantially the same horizontal plane as said first baffle, the inner diameter of said third peripheral baffle being at least as small as the outer diameter of said first peripheral baffle.

3. In pebble heater apparatus utilizing a moving bed of pebbles, an improved pebble chamber comprising an upright closed outer shell having a conical bottom; pebble inlet means disposed in the top portion of said shell; gaseous effluent outlet means in the upper portion of said shell; a pebble outlet in the lower end of said shell; a conical baffle disposed coaxially with and spaced a sufficient distance above said pebble outlet to be above the angle of repose taken at said pebble outlet but below the angle of slip, said baffle being larger in diameter than said pebble outlet and having a slope of between 25° and 55°; an annular inverted V baffle, having an inner diameter smaller than the outer diameter of said conical baffle and an outer diameter larger than said conical baffle, coaxially disposed with and spaced above said conical baffle in the lower portion of said chamber, said inverted V having a slope of between 25° and 55°; a gas distribution chamber below and adjacent the conical lower portion of said shell; gas inlet means in said distribution chamber; and gas outlet means communicating through said conical bottom of said shell between said distribution chamber and points adjacent the lower side of the said baffles.

4. The pebble chamber of claim 3, wherein said gas outlet means comprises conduit members which support said baffles.

5. A pebble heater apparatus comprising in combination a closed upper shell; pebble inlet means disposed in the top portion of said upper shell; first gaseous effluent outlet means in the upper portion of said upper shell; a pebble outlet in the lower portion of said upper shell; a circular baffle, spaced coaxially with and a sufficient distance above said pebble outlet to be above the angle of repose taken at said pebble outlet but below the angle of slip, said baffle being in the lower portion of the chamber formed within said upper shell and being larger in diameter than said pebble outlet; an annular baffle having an inner diameter smaller than the diameter of said circular baffle and an outer diameter larger than said circular baffle, coaxially disposed with and spaced above said circular baffle in the lower portion of said upper chamber; a combustion chamber adjacent the lower portion of said upper shell; burner means in said combustion chamber; combustion gas conduit means communicating between said combustion chamber and points adjacent the lower side of said baffles; a closed lower shell communicating at its upper end with said pebble outlet from said upper shell; second gaseous effluent outlet means in the upper portion of said lower shell; a pebble outlet in the lower portion of said lower shell; a circular baffle spaced coaxially with and a sufficient distance above said pebble outlet to be above the angle of repose taken at said pebble outlet but below the angle of slip, said baffle being in the lower portion of the chamber formed within said lower shell and being larger in diameter than said pebble outlet; an annular baffle having an inner diameter smaller than the diameter of said circular baffle and an outer diameter larger than said circular baffle, coaxially disposed with and spaced above said circular baffle in the lower portion of said lower chamber; a gas distribution chamber adjacent the lower portion of said lower shell; gas inlet means in said gas distribution chamber, gas conduit means communicating between said gas distribution chamber and points adjacent the lower side of said baffles; and pebble recycle means adapted so as to recycle pebbles from the pebble outlet of said lower chamber to the pebble inlet of said upper chamber.

6. In pebble heater apparatus utilizing a moving bed of pebbles, an improved pebble chamber comprising an upright closed outer shell having a conical bottom; pebble inlet means disposed in the top portion of said shell; gaseous effluent outlet means in the upper portion of said shell; a pebble outlet in the lower end of said shell; a perforate baffle disposed coaxially with and spaced a sufficient distance above said pebble outlet to be above the angle of repose taken at said pebble outlet but below the angle of slip, said baffle being larger in diameter than said pebble outlet, a gas distribution chamber below and adjacent the conical lower portion of said shell; gas inlet means in said distribution chamber; and gas outlet means communicating through said conical bottom of said shell between said distribution chamber and the pebble chamber within said shell, said outlet means comprising conduit members extending between said distribution chamber and points adjacent the lower side of said perforate baffle.

7. In pebble heater apparatus utilizing a moving bed of pebbles, an improved pebble chamber comprising an upright closed outer shell having a conical bottom; pebble inlet means disposed in the top portion of said shell; gaseous effluent outlet means in the upper portion of said shell; a pebble outlet in the lower end of said shell; a perforate baffle disposed coaxially with and spaced a sufficient distance above said pebble outlet to be above the angle of repose taken at said pebble outlet but below the angle of slip, said baffle being larger in diameter than said pebble outlet; a gas distribution chamber below and adjacent the conical lower portion of said shell; gas inlet means in said distribution chamber; and gas outlet means communicating through said conical bottom of said shell between said distribution chamber and the pebble chamber within said shell, said outlet means comprising perforations communicating between said distribution chamber and the chamber within said shell and conduit members extending between said distribution chamber and points adjacent the lower side of perforate baffle.

ROBERT R. GOINS.

REFERENCES CITED

The following references are of record in the file of this patent:

UNITED STATES PATENTS

| Number | Name | Date |
|---|---|---|
| 309,485 | Munzinger | Dec. 16, 1884 |
| 1,148,331 | Olsson | July 27, 1915 |
| 1,498,514 | Hoffman | June 17, 1924 |
| 1,871,166 | Fahrback | Aug. 9, 1932 |
| 2,393,893 | Evans et al. | Jan. 29, 1946 |
| 2,430,669 | Crowley | Nov. 11, 1947 |
| 2,444,274 | Utterback | June 29, 1948 |
| 2,458,350 | Crowley, Jr. | Jan. 4, 1949 |
| 2,458,412 | Payne | May 20, 1949 |

FOREIGN PATENTS

| Number | Country | Date |
|---|---|---|
| 501,765 | Great Britain | Mar. 6, 1939 |